US011699135B2

(12) United States Patent
Le Callonnec et al.

(10) Patent No.: US 11,699,135 B2
(45) Date of Patent: Jul. 11, 2023

(54) METHOD AND SYSTEM TO DELEGATE ISSUANCE CAPABILITY TO A THIRD-PARTY

(71) Applicant: MASTERCARD INTERNATIONAL INCORPORATED, Purchase, NY (US)

(72) Inventors: Sébastien Le Callonnec, Greystones (IE); Rakesh Yadav, Cape Elizabeth, ME (US); Sarala Buradagunta, West Orange, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 282 days.

(21) Appl. No.: 17/204,261

(22) Filed: Mar. 17, 2021

(65) Prior Publication Data
US 2021/0295278 A1 Sep. 23, 2021

Related U.S. Application Data

(60) Provisional application No. 62/992,876, filed on Mar. 20, 2020.

(51) Int. Cl.
*G06Q 20/02* (2012.01)
*G06Q 10/10* (2023.01)
(Continued)

(52) U.S. Cl.
CPC ............. *G06Q 20/02* (2013.01); *G06Q 10/10* (2013.01); *G06Q 20/3825* (2013.01);
(Continued)

(58) Field of Classification Search
CPC ............... G06Q 20/02; G06Q 20/3825; G06Q 20/3829; G06Q 20/0655; G06Q 20/3827;
(Continued)

(56) References Cited

U.S. PATENT DOCUMENTS 11,501,370 B1 * 11/2022 Paya ................... G06Q 20/3825
11,562,333 B1 * 1/2023 James ................. H04L 67/1042
(Continued)

FOREIGN PATENT DOCUMENTS

KR 10-2018-0027451 A 3/2018

OTHER PUBLICATIONS

Merriam-Webster.com Dictionary ("Fungible." Merriam-Webster. com Dictionary, Merriam-Webster, https://www.merriam-webster. com/dictionary/fungible. Accessed Feb. 15, 2023) (Year: 2023).*
(Continued)

*Primary Examiner* — James D Nigh
(74) *Attorney, Agent, or Firm* — Panitch Schwarze Belisario & Nadel LLP

(57) ABSTRACT

Delegating issuance capability to a third-party of fungible digital assets involves a central (e.g., central bank) processor receiving a request to issue fungible digital assets from a third-party node; verifying the request; validating request to issue fungible digital assets from the third-party; approving or rejecting the request; if the request to issue fungible digital assets is approved, creating an issuance authorization message; executing a smart contract clause to add an entity of the third-party node to a list of authorized entities; publishing the issuance authorization message on a blockchain indicating that a third-party node has been added to the list of authorized entities; and publishing a revocation message on the blockchain revoking an authorization granted to the third-party node to issue digital assets.

20 Claims, 8 Drawing Sheets

(51) Int. Cl.
 *G06Q 20/38* (2012.01)
 *H04L 9/40* (2022.01)
 *G06Q 20/06* (2012.01)

(52) U.S. Cl.
 CPC ....... *G06Q 20/3829* (2013.01); *H04L 63/101* (2013.01); *H04L 63/18* (2013.01); *G06Q 20/0655* (2013.01)

(58) Field of Classification Search
 CPC .... G06Q 20/389; G06Q 20/40; G06Q 20/405; G06Q 10/10; H04L 63/101; H04L 63/18; H04L 63/0471; H04L 63/126
 USPC .......................................................... 705/71
 See application file for complete search history.

(56) References Cited

U.S. PATENT DOCUMENTS

| | | | |
|---|---|---|---|
| 2016/0217437 A1 | 7/2016 | Park | |
| 2016/0335626 A1 | 11/2016 | Ko et al. | |
| 2017/0005804 A1* | 1/2017 | Zinder | H04L 63/123 |
| 2020/0090143 A1 | 3/2020 | Iervolino | |
| 2022/0284428 A1* | 9/2022 | Zhou | G06Q 20/401 |

OTHER PUBLICATIONS

Digital Asset definition, (https://www.investopedia.com/terms/d/digital-asset-framework.asp, Jun. 30, 2022) (Year: 2022).*
Merriam-Webster.com Dictionary ("Delegate." Merriam-Webster.com Dictionary, Merriam-Webster, https://www.merriam-webster.com/dictionary/delegate. Accessed Feb. 16, 2023) (Year: 2023).*
Delegate definition, Black's Law Dictionary (11th ed. 2019, 1 page) (Year: 2019).*
Grant definition, Black's Law Dictionary (11th ed. 2019, 1 page) (Year: 2019).*
Hockett "Money's Past is Fintech's Future: Wildcat Crypto, the Digital Dollar, and Citizen Central Banking", Stanford Journal of Blockchain Law and Policy, vol. 2.2, pp. 221-231, Oct. 1, 2019 (Year: 2019).*
Brainard "The Digitization of Payments and Currency: Some Issues for Consideration", Symposium on the Future of Payments Stanford School of Business, Feb. 5, 2020, 14 pages (Year: 2020).*
Houben et al. "Central bank digital currencies", Committee on Payments and Market Infrastructures, Markets Committee, Bank for International Settlements, Mar. 2018, 34 pages (Year: 2018).*
Notification of Transmittal of the International Search Report (Forms PCT/ISA/220 and PCT/ISA/210) and the Written Opinion of the International Searching Authority (Form PCT/ISA/237) dated Jul. 9, 2021, by the International Application Division Korean Intellectual Property Office in corresponding International Application No. PCT/US2021/022707. (9 pages).

* cited by examiner

METHOD AND SYSTEM TO DELEGATE ISSUANCE CAPABILITY TO A THIRD-PARTY

FIELD

The present disclosure relates to methods and systems for delegating issuance capability to a third-party, and more particularly, a method and system for delegating the issuance of fungible digital assets to a third-party approved by the entity regulating the asset issuance (e.g., central bank).

BACKGROUND

As technology advances and becomes more sophisticated, businesses, individuals and other entities often look for ways to improve how they do business and communicate with one another. One element in which computing technology has drastically changed the landscape is the conducting of transactions between two entities. Transactions can occur between two entities for any variety of reasons: payment to or from, the purchase of goods or services, exchange of data, acquisition of property, consideration for a contract, etc. In many cases, computing technology may provide a platform for which an entity may prove or verify a transaction and data associated therewith, as well as perform communications related thereto. For instance, sending money via a computing device can be performed significantly quicker than physical delivery.

However, computing devices and electronic communications can sometimes be compromised, placing entities and their property at risk. A number of methods have been developed to help secure such communications, such as secure communication channels and protocols and encryption for data messages. Similarly, methods have been developed to secure the storage of data. One such method is the use of a blockchain, where the blockchain is decentralized and where data stored therein is immutable, providing for reliable proof of data at a specific time, such as agreement of specific contract terms.

In the context of a digital currency, a centralized entity is responsible for issuing the asset, for example, typically, an entity taking the role of a central bank. For various reasons, this centralized entity may wish to delegate the issuance of this asset to a third-party, or a third-party may wish to issue digital assets on behalf of the central bank, for example, the central bank may want to rely on the third-party infrastructure for issuing without revealing its own keys, or the central bank wants to grant permission to the entity to create assets for leverage or interest generation.

It would be desirable to have a technical system that enables for delegating the issuance of fungible digital assets to a third-party approved by the entity regulating the asset issuance, for example, a central bank.

SUMMARY

The present disclosure provides a description of systems and methods for delegating the issuance of fungible digital assets to a third-party approved by the entity regulating the asset issuance.

In accordance with an aspect, a method is disclosed for delegating issuance capability to a third-party of fungible digital assets, the method comprising: receiving, on a central processor, a signed request to issue fungible digital assets from a third-party node; verifying, on the central processor, a signature of the signed request to issue fungible digital assets from the third-party; validating, on the central processor, the signed request to issue fungible digital assets from the third-party; approving or rejecting, on the central processor, the signed request to issue fungible digital assets from the third-party node; if the request to issue fungible digital assets is approved, creating, by the central processor, an issuance authorization message; executing, by the central processor, a smart contract clause to add an entity of the third-party node to a list of authorized entities; and publishing, by central processor, the issuance authorization message signed by an entity of the central processor on a blockchain indicating that the third-party node has been added to the list of authorized entities.

A system is disclosed for delegating issuance capability to a third-party of fungible digital assets, the system comprising: a central processor configured to: receive a signed request to issue fungible digital assets from a third-party node; verify a signature of the signed request to issue fungible digital assets from the third-party; validate the signed request to issue fungible digital assets from the third-party; approve or reject the signed request to issue fungible digital assets from the third-party node; if the request to issue fungible digital assets is approved, create an issuance authorization message; execute a smart contract clause to add an entity of the third-party node to a list of authorized entities; and publish the issuance authorization message signed by an entity of the central processor on a blockchain indicating that the third-party node has been added to the list of authorized entities.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
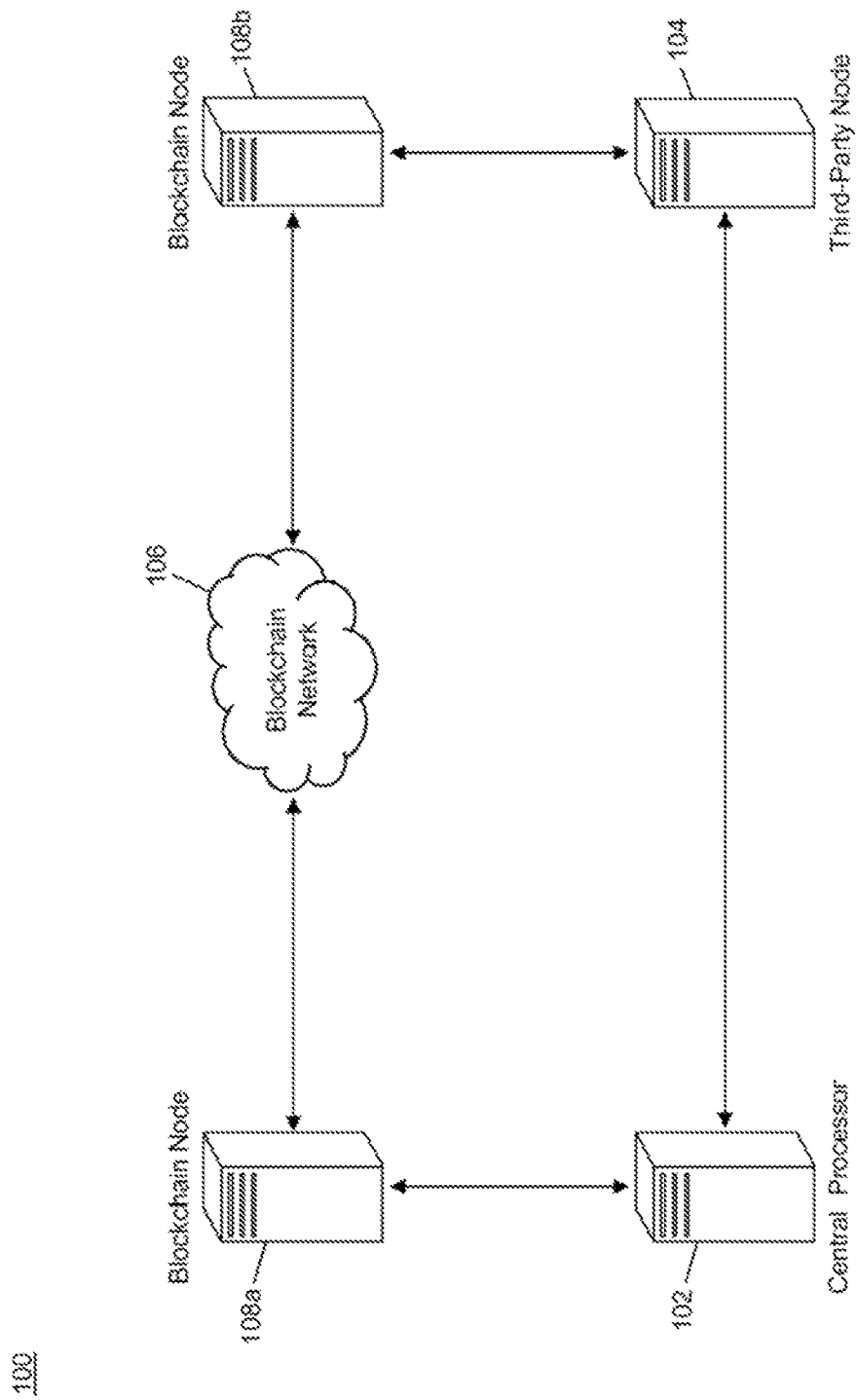
FIG. 1 is a block diagram illustrating a high level system architecture for delegating issuance capability to a third-party thereof in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain— A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Smart Contract—Computer protocols that facilitate, verify, or enforce the negotiation or performance of a transaction. A smart contract may be formatted as an executable script or other type of computing function such that, when the contract is executed by a suitable processor, one or more predetermined actions are performed. In many instances, a smart contract may emulate the clauses of a traditional contract, such as by being configured to perform the actions associated with positive performance or negative performance (e.g., breach) of the terms of the smart contract. For instance, digital assets implemented on blockchain network are typically defined using smart contracts. The smart contracts can define clauses, for example, to issue assets, to transfer assets, and to withdraw (or "burn") assets. The smart contracts defining the rules for the digital asset need to define a list of authorized entities that can issue assets (optionally with an "authorized until" timestamp which indicates the date and time until which the authorized entity may issue assets), a clause to add an entity to the list of authorized entities, and a clause to remove an entity from the list of authorized entities. In addition, the issuing clause must be amended to verify whether a third-party requesting an asset issuance belongs to the list of authorized entities.

Central Bank—Generally a financial institution given privileged control over the production and distribution of money and credit for a nation or a group of nations, or other assets and other groups (e.g., fiat currency, cryptocurrency, other physical and digital assets used by groups of people). In the context of this document, this term refers to the computer systems and infrastructure of a central bank, i.e., a central processor 102, except when taken in context it means a legal entity.

System for Delegating Issuance Capability to a Third-Party

FIG. 1 illustrates a system 100 for delegating issuance of fungible digital assets to a third-party entity approved by entity regulating the asset issuance (for example, a central bank).

The system 100 may include a central processor 102. The central processor 102 of a central bank, discussed in more detail below, may be specifically configured to perform actions discussed herein related to the generation of data for posting to a blockchain and delegating issuance capability to a third-party, making it a special purpose computer when programmed to carry out these functions. The central processor 102 may be a computing system or part of a computing system for an entity that is configured for participation in an electronic transaction between the entity and another entity. For instance, the central processor 102 may exchange electronic communications with a third-party node 104 for a second entity also participating in an electronic transaction. As discussed herein, each of the functions performed by the central processor 102 and the third-party node 104 may also be performed by the corresponding computing device(s).

The system 100 may also include a blockchain network 106, which may be associated with a blockchain to which data discussed herein may be posted. The blockchain network 106 may be comprised of a plurality of blockchain nodes 108, such as the blockchain nodes 108a and 108b illustrated in FIG. 1. Although only two are shown in the illustration for clarity, it is contemplated many more, dozens, hundreds or even thousands, or even more might be used. The blockchain nodes 108 may be configured to generate and verify new blocks for addition to the blockchain using methods and systems that will be apparent to persons having skill in the relevant art. In some embodiments, for instance, the central processor 102 may be configured to, in addition to the functions discussed herein, generate new blocks, verify blocks, and add the new, verified blocks to the blockchain network 108.

The entity (for example, a central bank) associated with the central processor 102 may communicate with the entity (for example, a commercial bank) associated with the third-party node 104 regarding a proposed electronic transaction. In some embodiments, additional entities and/or other participants may be involved in a transaction.

Processing Server

Figure 2:
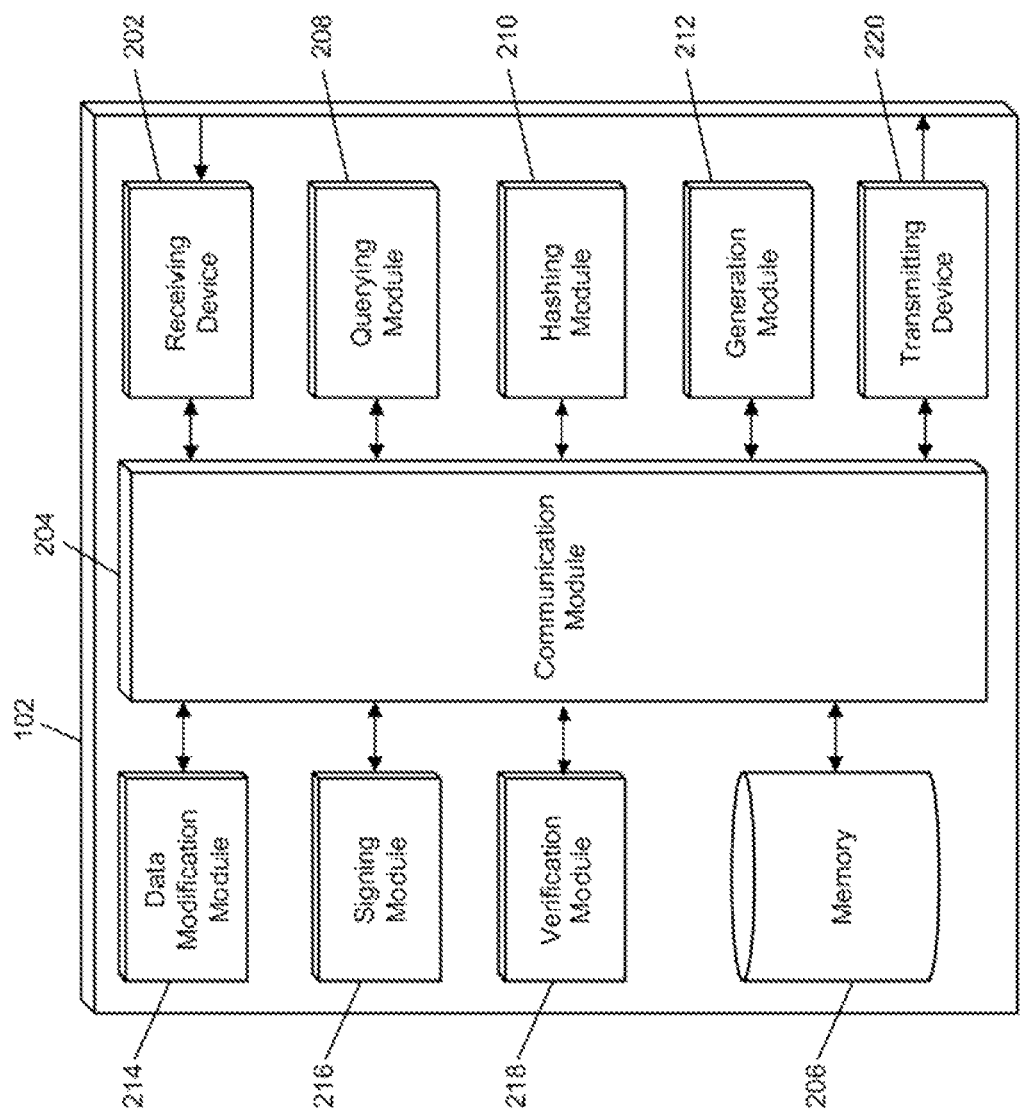
FIG. 2 is a block diagram illustrating the processing server of the system of FIG. 1 for the delegating issuance capability to third-party in accordance with exemplary embodiments.

FIG. 2 illustrates an embodiment of a central processor 102 in the system 100. It will be apparent to persons having skill in the relevant art that the embodiment of the central processor 102 illustrated in FIG. 2 is provided as illustration only and may not be exhaustive to all possible configurations of the central processor 102 suitable for performing the functions as discussed herein. For example, the computer system 800 illustrated in FIG. 8 and discussed in more detail below may be a suitable configuration of the central processor 102. In some embodiments, the third-party node 104 in the system 100 as illustrated in FIG. 1 and discussed herein may be implemented using the components of the central processor 102 as illustrated in FIG. 2 and discussed below.

The central processor 102 may include a receiving device 202. The receiving device 202 may be configured to receive data over one or more networks via one or more network protocols. In some instances, the receiving device 202 may be configured to receive data from third-party node 104, blockchain networks 106, blockchain nodes 108, and other systems and entities via one or more communication methods, such as near field communication, Bluetooth, the Internet, local area networks, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain networks 106 and/or blockchain nodes 108 associated therewith that may be superimposed or otherwise encoded with blockchain data. The blockchain may be comprised of a plurality of blocks, each block being comprised of at least a block header and one or more transaction values. A block header may include at least a timestamp and a reference to a prior block in the blockchain. In some embodiments, the reference may be a hash of the block header of the prior block. In some cases, a block header may also include a Merkle root of a Merkle tree generated for the transaction values included in the block. In the methods and systems discussed herein, the one or more transaction values may each be comprised of a transaction hash, which may be a hash of at least the inputs for the related transaction. The receiving device 202 may also be configured to receive data signals electronically transmitted by third-party node 104, such as may be superimposed or otherwise encoded with deterministic inputs or data associated therewith, such as a template reference, smart contract reference, performance data, etc.

The central processor 102 may also include a communication module 204. The communication module 204 may be configured to transmit data between modules, engines, databases, memories, and other components of the central processor 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the central processor 102 and external components of the central processor 102, such as externally connected databases, display devices, input devices, etc. The central processor 102 may also include a processing device. The processing device may be configured to perform the functions of the central processor 102 discussed herein as will be apparent to persons having skill in the relevant art, such as a processor configured to execute smart contracts, such as via the execution of executable scripts associated therewith. In some embodiments, the processing device may include and/or be comprised of a plurality of engines and/or modules specially configured to perform one or more functions of the processing device, such as a querying module 208, hashing module 210, generation module 212, data modification module 214, signing module 216, verification module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The central processor 102 may also include a memory 206. The memory 206 may be configured to store data for use by the central processor 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the central processor 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store the blockchain, such as may be received from the blockchain network 106, as discussed above. The memory 206 may also be configured to store a key-value database, which may be comprised of a plurality of key-value pairs. In such instances, key-value pairs may include pairs where a hash value is used as a key, with the data used to generate the hash value being the corresponding value, which may be used to store deterministic inputs, data templates, smart contracts, and other data for use in performing the functions discussed herein. The memory 206 may also be configured to store private keys and public keys of key pairs, which may be configured for use in digitally signing transaction values and the verification of digital signatures.

The central processor 102 may include a querying module 208. The querying module 208 may be configured to execute queries on databases to identify and perform other actions related to information. The querying module 208 may receive one or more data values or query strings, and may execute a query string based thereon on an indicated database, such as the memory 206, to identify, modify, insert, update, etc. information stored therein. The querying module 208 may output identified information to an appropriate engine or module of the central processor 102 as necessary. The querying module 208 may, for example, execute a query on the memory 206 to identify a private key for use in digitally signing a transaction value, to add a new key-value pair for a new transaction being tracked using the blockchain, to identify a smart contract for execution for use in the verification of performance of a transaction, etc.

The central processor 102 may also include a hashing module 210. The hashing module 210 may be configured to hash data for the central processor 102 for the generation of hash values. The hashing module 210 may receive data to be hashed as input, may generate hash values via the application of one or more hashing algorithms thereto, and may output the resulting hash value to another module or engine of the central processor 102. In some embodiments, the input may include the one or more hashing algorithms or indications thereof. In other embodiments, the hashing module 210 may be configured to identify the hashing algorithm(s) (e.g., in the memory 206) to be used. The hashing module 210 may be configured, for example, to generate hash values of transaction values, templates, smart contracts, and other data via the application of one or more hashing algorithms thereto. In some instances, the generated hash values may be used for storage in the blockchain, serving as keys in key-value pairs stored in the memory 206, or for verification of performance based on blockchain data.

The central processor 102 may also include a generation module 212. The generation module 212 may be configured to generate data for use in performing the functions of the central processor 102 as discussed herein. The generation module 212 may receive instructions as input, which may be used to generate data, and the generated data output to one or more engines or modules of the central processor 102. In some instances, the instructions input to the generation module 212 may be accompanied by data for use therewith. In some embodiments, the generation module 212 may be configured to generate a data file, such as may include deterministic inputs using a predetermined format (e.g., detailed in a template), which may be hashed for use as a transaction value to be stored in the blockchain.

The central processor 102 may also include a data modification module 214. The data modification module 214 may be configured to modify data and/or data files for use in performing the functions of the central processor 102 as discussed herein. The data modification module 214 may receive instructions as input, which may be used to modify data stored in or received by the central processor 102, and the modified data output to one or more engines or modules of the central processor 102. For example, the data modification module 214 may be configured to modify a data file (e.g., storing deterministic inputs) to change one or more inputs, such as by removing an input, adding an input, changing the value of an input, etc.

The central processor 102 may also include a signing module 216. The signing module 216 may be configured to digitally sign data as part of the functions of the central processor 102 as discussed herein. The signing module 216 may receive data to be digitally signed as input, may digitally sign the data, and may output the digitally signed data, or at least the digital signature, to another module or engine of the central processor 102. The signing module 216 may be configured to digitally sign data via the use of a public key and one or more signing algorithms. In some embodiments, the input to the signing module 216 may include the private key and/or signing algorithms to be used in generating the digital signature. In other embodiments, the signing module 216 may be configured to identify (e.g., in the memory 206, such as via instructions submitted to the querying module 208) the private key and signing algorithm(s).

The central processor 102 may also include a verification module 218. The verification module 218 may be configured to verify data for the central processor 102. The verification module 218 may receive data to be verified as input, may perform verification of the data, and may output a result (e.g., indicating positive or negative verification) of the verification to another module or engine of the central processor 102. For example, the verification module 218 may be configured to verify the digital signature on a transaction value (e.g., read from a block of the blockchain) using a public key (e.g., stored in the memory 206 and read therefrom), and to verify transaction values, such as by the comparison of an estimated transaction value (e.g., generated by the generation module 212) with a transaction value read from the blockchain.

The central processor 102 may also include a transmitting device 220. The transmitting device 220 may be configured to transmit data over one or more networks via one or more network protocols. In some instances, the transmitting device 220 may be configured to transmit data to third-party node 104, blockchain networks 106, blockchain nodes 108, and other entities via one or more communication methods, such as near field communication, Bluetooth, radio frequency, the Internet, local area networks, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 108 associated with a blockchain network 106 that may be superimposed or otherwise encoded with transaction values for posting to the blockchain. In some embodiments, the transmitting device 220 may be configured to electronically transmit data signals to third-party node 104, such as for the exchange of deterministic inputs, smart contract references, template references, public keys, or other data that may be exchanged for use in the performing the functions discussed herein.

Process for Issuing a Permission Request

Figure 3:
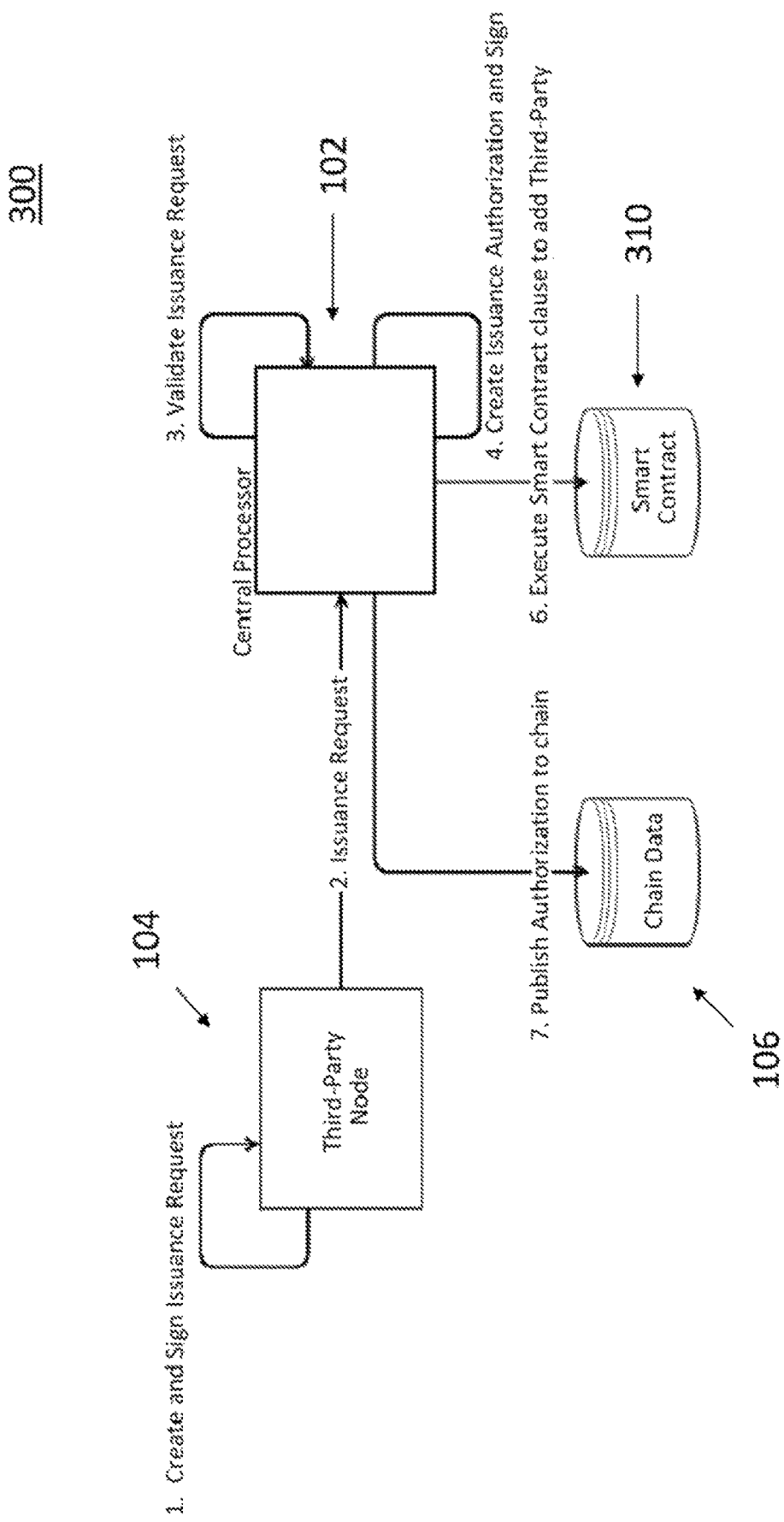
FIG. 3 is a diagram illustrating a process for issuing a permission request in accordance with an exemplary embodiment.

FIG. 3 is a diagram illustrating a process 300 for issuing a permission request in accordance with an exemplary embodiment. As shown in FIG. 3, a third-party node 104 on behalf of a third-party can request permission from a central processor 102, for example, associate with a central bank, to issue assets on behalf of the third-party node 104. In step 1, the third-party node 104 creates a request to issue assets, and signs the request. In accordance with an exemplary embodiment, the assets can be, for example, fungible digital assets and/or fungible tokens. The third-party node 104 connects with the central processor 102 for example, on a private channel, and in a step 2 sends the signed issuance request to the central processor 102. In step 3, the central processor 102 verifies the signature of the request, and validates the issuance request. In step 4, if the central processor 102 decides to approve the issuance request, the central processor 102 creates an issuance authorization message, and signs the issuance authorization message. Alternatively, in a step 5 (which is not shown) the central processor 102 can reject the issuance request, and the issuance request is simply ignored. In step 6, the central processor 102 executes the smart contract clause 310 to add the third-party node 104 (i.e., third-party entity) to the list of authorized entities. If the authorization is temporary, a timestamp can be added as well, indicating until when this authorization is valid. In step 7, the central processor 102 publishes the authorization message on the blockchain network 106, and once the third-party node 104 detects the confirmed authorization to issue signed by the central processor 102 on the blockchain network 106, the third-party entity can start issuing assets, for example, on behalf of the central bank.

Figure 4:
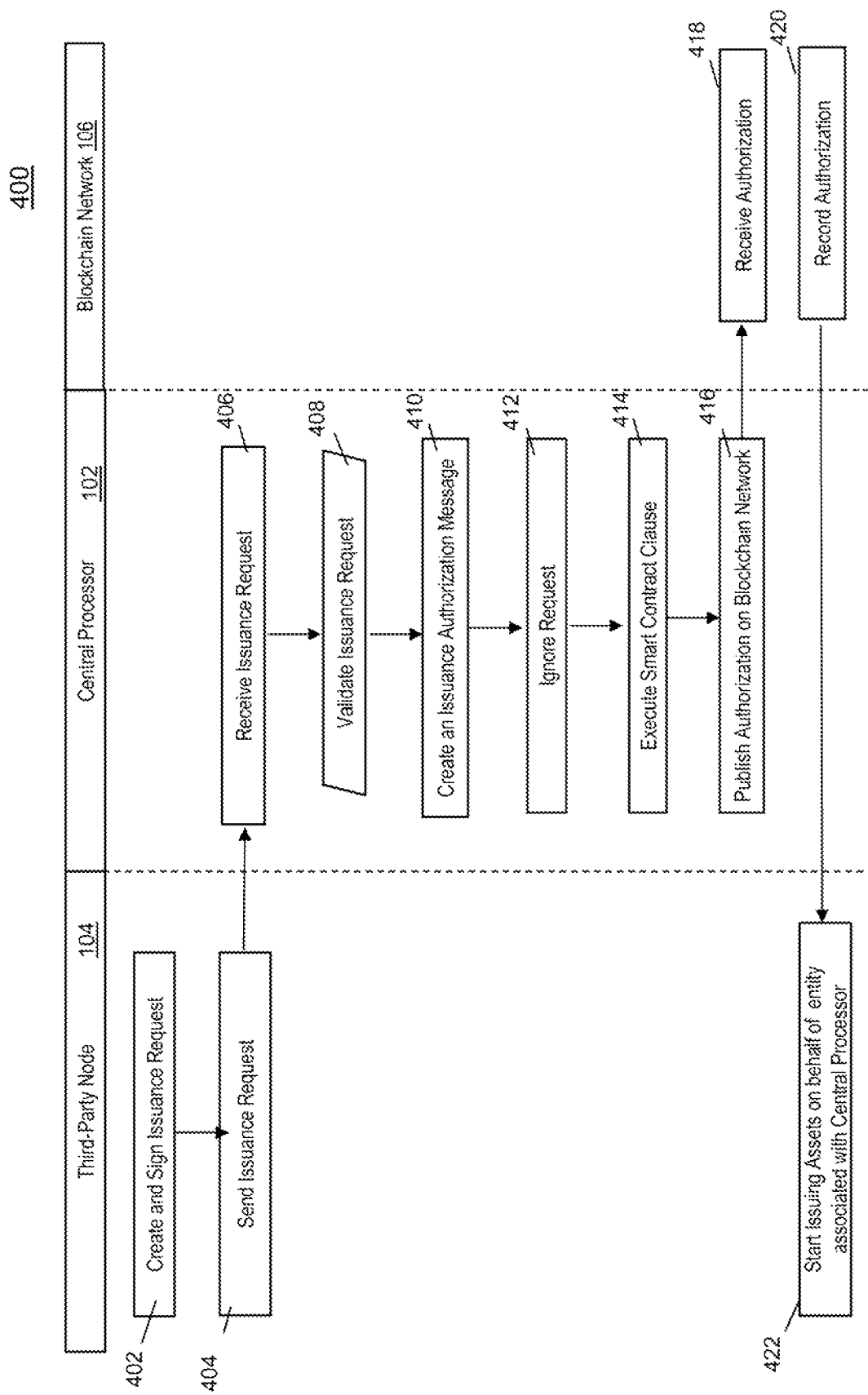
FIG. 4 is a flow diagram illustrating a process for issuing a permission request as shown in FIG. 3 in accordance with an exemplary embodiment.

FIG. 4 is a flow diagram 400 illustrating a process for issuing a permission request as shown in FIG. 3 in accordance with an exemplary embodiment. As shown in FIG. 4, in step 402, the third-party node 104 creates a request to issue assets and signs the request. In step 404, the third-party node 104 connects with the central processor 102 for example, on a private channel, and sends the signed issuance request to the central processor 102. In step 406, the central processor 102 receives the request. In step 408, the central processor 102 verifies the signature of the request, and validates the issuance request. In step 410, if the central processor 102 decides to approve the issuance request, the central processor 102 creates an issuance authorization message, and signs the issuance authorization message. Alternatively, in a step 412, the central processor 102 can reject the issuance request, and the issuance request is simply ignored. In step 414, if the central processor 102 has accepted the issuance request, the central processor 102 executes the smart contract clause to add the third-party node 104 (i.e., third-party entity) to the list of authorized entities. If the authorization is temporary, a timestamp can be added as well, indicating until when this authorization is valid. In step 416, the central processor 102 publishes the authorization message on the blockchain network 106. In step 418, the blockchain network 106 records the authorization message. In step 420, the blockchain network 106 transmits the authorization message to the third-party node 104. In step 422, once the third-party node 104 detects the confirmed authorization to issue signed by the central processor 102 on the blockchain network 106, the third-party entity can start issuing assets on behalf of the entity associated with the central processor 102.

In accordance with an embodiment, the authorization message published on the blockchain network 106 can be used by participants to verify whether an asset they have received from the third-party can be trusted. For example, the issuance authorization can contain the following details: the public key of the third-party entity being authorized to issue assets on behalf of the entity of the central processor 102, i.e., the central bank, a timestamp after which the third-party entity is being authorized to issue assets, and optionally a timestamp until which the third-party entity is authorized to issue assets on behalf of the entity of the central processor (or central bank). In the case of a partitioned chain, for example, the entity of the central processor 102 (i.e., central bank) may decide to publish the issuance authorizations to a dedicated partition that can be easily checked by other participants on the blockchain network 106.

Process for Issuance of Assets

Figure 5:
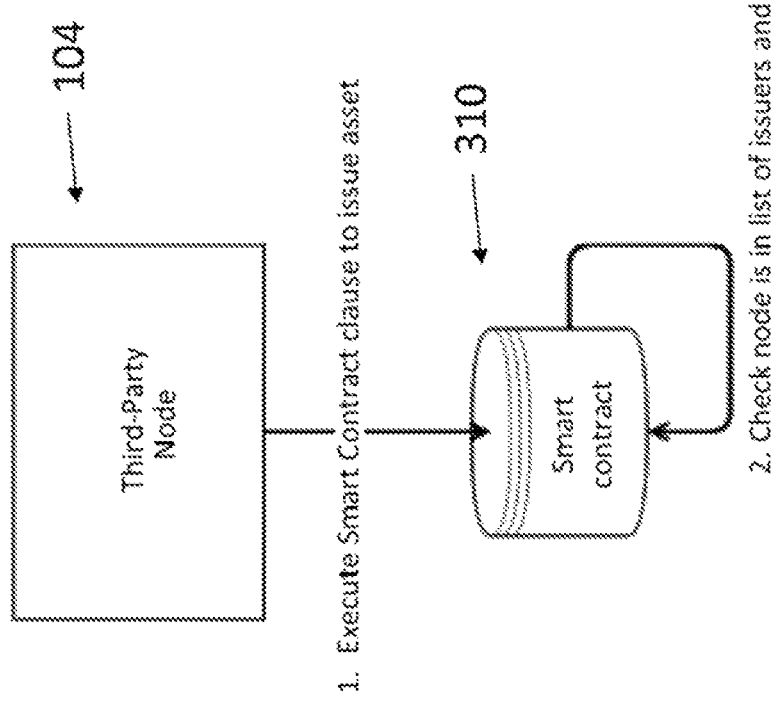
FIG. 5 is a diagram illustrating a process for issuance of assets on behalf of an entity, for example, a central bank, by a third-party node in accordance with an exemplary embodiment.

FIG. 5 is a diagram illustrating a process 500 for issuance of assets on behalf of an entity, for example, a central bank, by a third-party node 104 in accordance with an exemplary embodiment. As shown in FIG. 5, once a third-party node 104 has been authorized to issue assets on behalf of the entity associated with the central processor 102 (i.e., central bank), the third-party node 104 may, in step 1, start creating new assets by invoking the issuance smart contract clause 310. When receiving assets issued by a third-party node 104, other participants can, in step 2, verify that the entry creating new assets is indeed valid by similarly verifying that the third-party node 104 that issued those assets had a valid issuance authorization at the time of issuance, and that those assets have not been invalidated, for example, on the blockchain node 108a, 108b, in the list of third-party node 104, for example, in a list of issuers and issue.

Process for Revocation of an Issuance Permission

Figure 6:
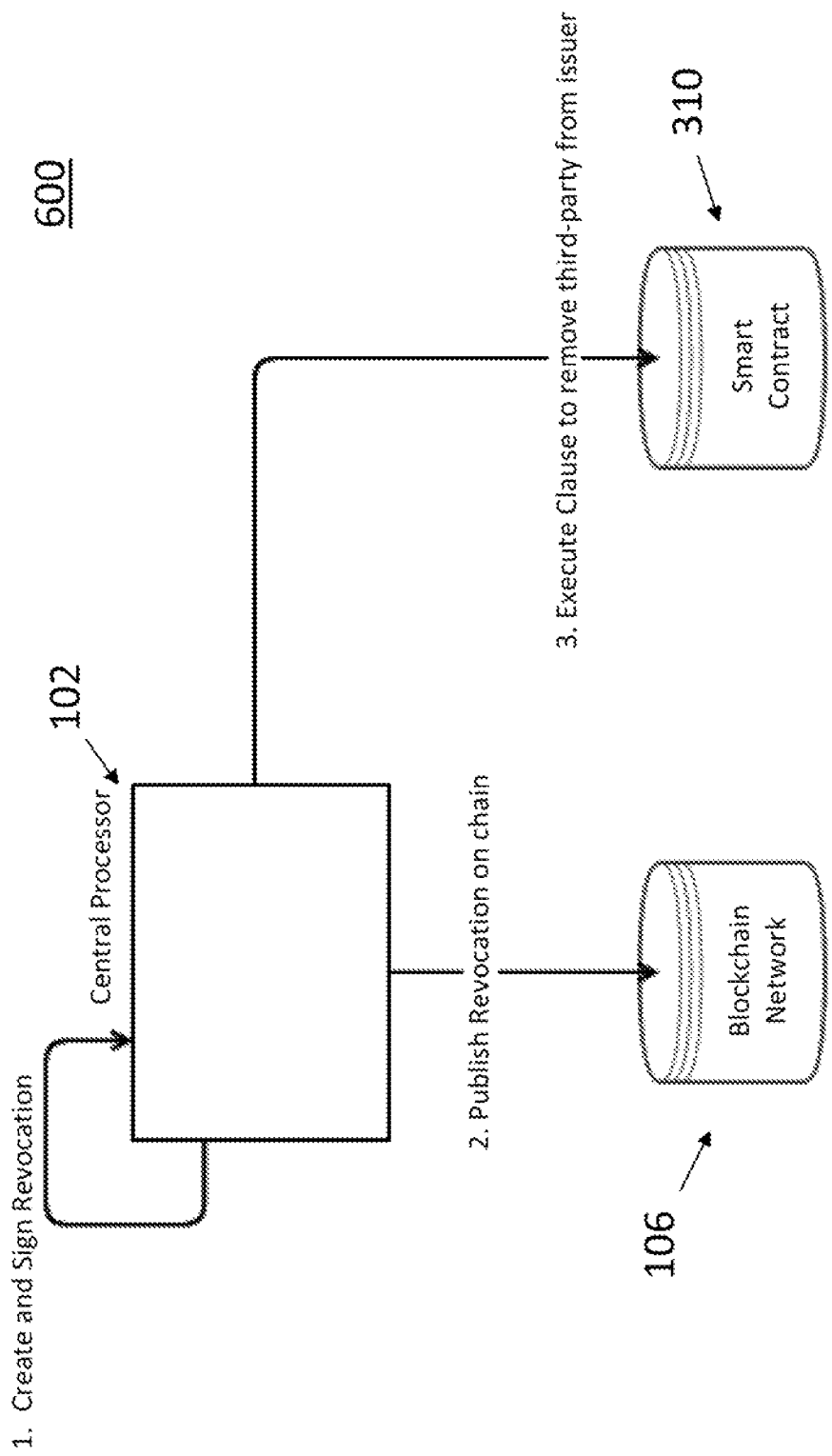
FIG. 6 is a diagram illustrating a process for revocation of an issuance permission to a third-party entity in accordance with an exemplary embodiment.

FIG. 6 is a diagram illustrating a process 600 for revocation of an issuance permission to a third-party entity in accordance with an exemplary embodiment. As shown in FIG. 6, the entity (i.e., central bank) associated with the central processor 102 may revoke permission to issue from the third-party node 104 at any time. In accordance with an embodiment, revocation can be done by: create and sign a revocation message (step 1), publish the revocation message on the blockchain network 106 (step 2), and executing the smart contract clause 310 removing the third-party from the list of authorized entities (step 3).

Figure 7:
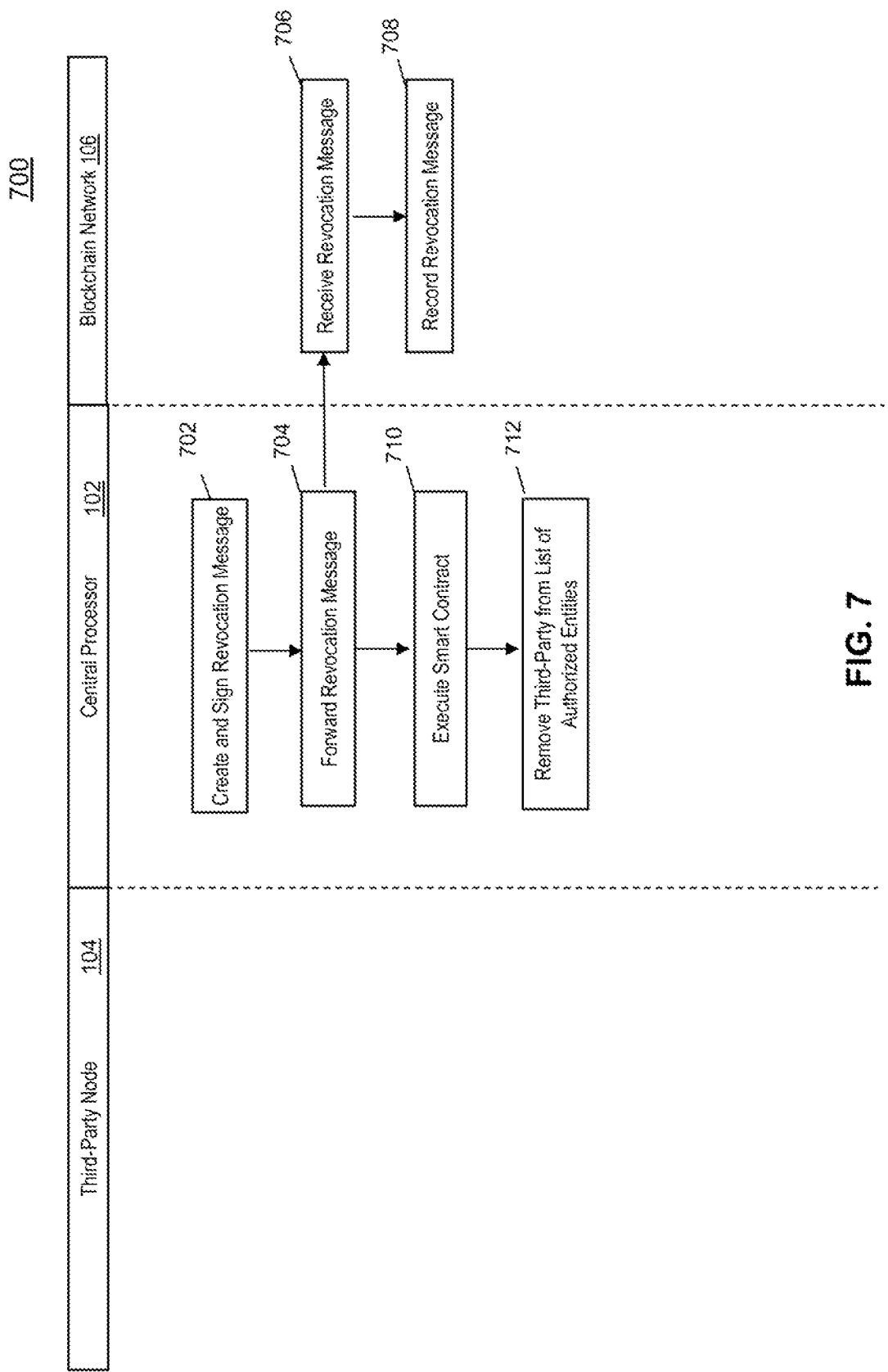
FIG. 7 is flow diagram illustrating a process for revocation of an issuance permission to a third-party entity in accordance with an exemplary embodiment

FIG. 7 is flow diagram 700 illustrating a process for revocation of an issuance permission to a third-party entity in accordance with an exemplary embodiment. As shown in FIG. 7, the smart contract clause is executed by the central processor 102 removing the third-party associated with the third-party node 104 from a list of authorized entities. In step 702, the central processor 102 on behalf of the entity regulating the asset issuance creates and signs a revocation message. In step 704, the revocation message is sent to the blockchain network 106. In step 706, the revocation message is received in the blockchain network 106 and in step 708 recorded in the blockchain network 106. In accordance with an exemplary embodiment, the revocation message recorded in step 708 contains the following details: the public key of the third-party entity, a reference to the original authorization (i.e. its hash), and optionally a flag indicating whether all assets issued by the third-party entity thus far are now invalid. In addition, all assets issued after the permission for that entity to issue has been revoked are now rejected. Furthermore, all assets issued prior to the revocation are still valid by default, unless the flag invalidating all assets issued by this entity is set in the revocation message, in which case all assets issued by this third-party are now invalid. In step 710, the smart contract clause removing the third-party entity node 104 from the list of authorized entities is executed. In step 712, the central processor 102 removes the third-party entity node 104 from the list of authorized entities to issue assets on behalf of the entity associated with the central processor 102.

Computer System Architecture

Figure 8:
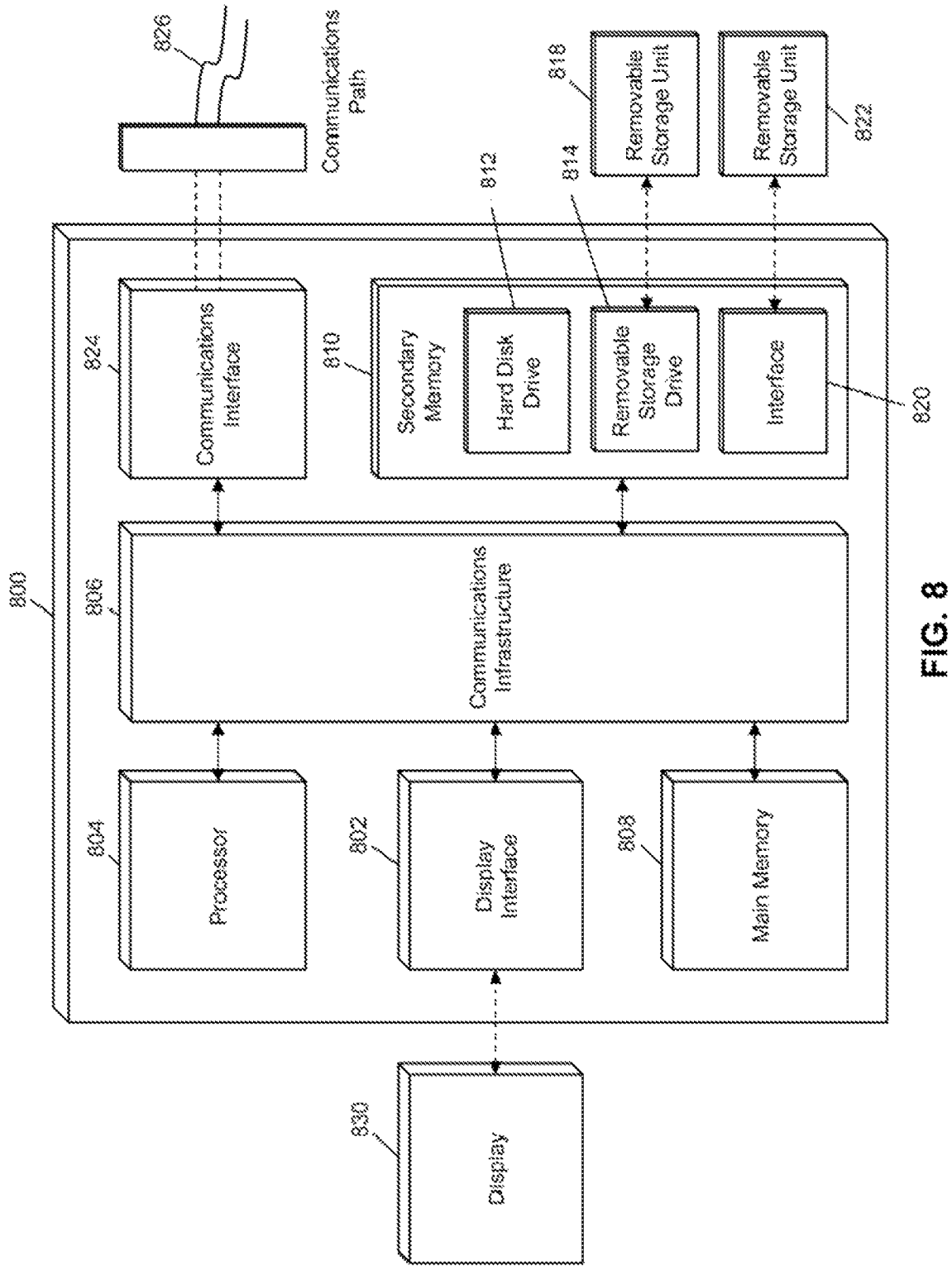
FIG. 8 illustrates a computer system in which embodiments of the present disclosure, or portions thereof, may be implemented as computer-readable code.

FIG. 8 illustrates a computer system 800 in which embodiments of the present disclosure, or portions thereof, may be implemented as computer-readable code. For example, the central processor 102 of FIG. 1 may be implemented in the computer system 800 using hardware, software executed on hardware, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for delegating issuance capability to a third-party. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for delegating issuance capability to a third-party of fungible digital assets, the method comprising:
   receiving, on a central processor, a signed request to issue fungible digital assets from a third-party node;
   verifying, on the central processor, a signature of the signed request to issue fungible digital assets from the third-party;
   validating, on the central processor, the signed request to issue fungible digital assets from the third-party;
   approving or rejecting, on the central process, the signed request to issue fungible digital assets from the third-party node;
   if the request to issue fungible digital assets is approved, creating, by the central processor, an issuance authorization message;
   executing, by the central processor, a smart contract clause to add an entity of the third-party node to a list of authorized entities; and
   publishing, by central processor, the issuance authorization message signed by an entity of the central processor on a blockchain indicating that the third-party node has been added to the list of authorized entities.

2. The method according to claim 1, further comprising:
   executing, by the central processor, a smart contract clause having a timestamp that indicates a date and time until when the entity of the third-party node may issue the fungible digital assets.

3. The method according to claim 1, comprising:
   executing, by the central processor, a smart contract clause to the authorization message to remove the entity of the third-party node from the list of authorized entities.

4. The method according to claim 3, wherein the removal of the entity of the third-party node from the list of authorized entities includes:
   creating and signing, by the central processor, a revocation message, the revocation message removing the entity of the third-party node from the list of authorized entities; and
   publishing, by the central processor, the revocation message on the blockchain.

5. The method according to claim 4, wherein the revocation message includes a public key of the third-party entity, a reference to an original authorization, and optionally, a flag indicating whether all fungible digital assets issued by the third-party entity are valid.

6. The method according to claim 1, further comprising:
   issuing, by the third-party node, fungible digital assets upon detecting the authorization message signed by the entity of the central processor on the blockchain indicating that the third-party node has been added to the list of authorized entities.

7. The method according to claim 1, wherein the authorization message includes a public key of the third-party entity being authorized to issue fungible digital assets on behalf of the entity of the central processor, and a timestamp after which the third-party entity is authorized to issue fungible digital assets.

8. The method according to claim 1, further comprising:
   creating, by the third-party node, new fungible digital assets by invoking the smart contract issuing fungible assets on behalf of the central processor.

9. The method according to claim 1, further comprising:
   verifying, by other participants on the blockchain, that the entity of the third-party node is authorized to issue the fungible digital assets.

10. The method according to claim 1, further comprising:
    receiving, on the central processor, the signed request to issue the fungible digital assets from the third-party node over a private channel.

11. A system for delegating issuance capability to a third-party of fungible digital assets, the system comprising:
    a central processor configured to:
    receive a signed request to issue fungible digital assets from a third-party node;
    verify a signature of the signed request to issue fungible digital assets from the third-party;
    validate the signed request to issue fungible digital assets from the third-party;
    approve or reject the signed request to issue fungible digital assets from the third-party node;
    if the request to issue fungible digital assets is approved, create an issuance authorization message;
    execute a smart contract clause to add an entity of the third-party node to a list of authorized entities; and
    publish the issuance authorization message signed by an entity of the central processor on a blockchain indicating that the third-party node has been added to the list of authorized entities.

12. The system according to claim 11, wherein the central processor is further configured to:
    execute a smart contract clause having a timestamp that indicates a date and time until when the entity of the third-party node may issue the fungible digital assets.

13. The system according to claim 11, wherein the central processor is further configured to:
    execute a smart contract clause to the authorization message to remove the entity of the third-party node from the list of authorized entities.

14. The system according to claim 13, wherein the removal of the entity of the third-party node from the list of authorized entities includes the central processor being configured to:
    create and sign a revocation message, the revocation message removing the entity of the third-party node from the list of authorized entities; and publishing, by the central processor, the revocation message on the blockchain.

15. The system according to claim 14, wherein the revocation message includes a public key of the third-party entity, a reference to an original authorization, and optionally, a flag indicating whether all fungible digital assets issued by the third-party entity are valid.

16. The system according to claim 11, wherein the third-party node is configured to:
   issue fungible digital assets upon detecting the authorization message signed by the entity of the central processor on the blockchain indicating that the third-party node has been added to the list of authorized entities.

17. The system according to claim 11, wherein the authorization message includes a public key the third-party entity being authorized to issue fungible digital assets on behalf of the entity of the central processor, and a timestamp after which the third-party entity is authorized to issue fungible digital assets.

18. The system according to claim 11, wherein the third-party node is configured to:
   create new fungible digital assets by invoking the smart contract clause adding the entity of the third-party node to the list of authorized entities.

19. The system according to claim 11, wherein other participants can verify that the entity of the third-party node is authorized to issue the fungible digital assets.

20. The system according to claim 11, wherein the central processor is configured to:
   receive the signed request to issue the fungible digital assets from the third-party node over a private channel.

* * * * *